UNITED STATES PATENT OFFICE.

ALICE MACDONALD, OF LONDON, ENGLAND.

PROCESS OF PRODUCING WHITE-LEAD PIGMENT, &c.

SPECIFICATION forming part of Letters Patent No. 575,844, dated January 26, 1897.

Application filed November 30, 1896. Serial No. 613,988. (No specimens.)

*To all whom it may concern:*

Be it known that I, ALICE MACDONALD, a citizen of Scotland, residing at 13 Ladbroke Grove, Notting Hill, London, England, have invented a new and useful Improvement in the Production of White-Lead Pigment and the Separation of Metallic Lead from Lead Sulfid, of which the following is a specification.

In the specification of my United States Patent No. 544,584, granted August 13, 1895, I described a process for producing white-lead pigment and separating metallic lead from lead sulfid, such as galena.

My present invention relates to a modification of this process, by which I obtain a better pigment. For this purpose I fuse galena or lead sulfid, and on the surface of the fluid, but not into the fluid, I direct a current of air and steam, either separately or mixed together. In the latter case the steam may be used to propel the air by injector action. By this means a basic lead sulfate of great purity of color is volatilized, and being collected in the usual way can be used directly as a pigment. Its composition, which is constant, has the formula $$2PbSO_4 + PbO,$$

and its constitution is similar to that of ordinary white lead. A quantity of metallic lead is also set free, which carries with it all the silver of the ore, and there is an evolution of sulfur dioxid, which can be employed in the usual way.

Having thus described my invention, what I claim, and desire to secure by Letters Patent, is—

The process described for producing white-lead pigment and separating metallic lead from lead sulfid by fusing the sulfid and directing air and steam currents on the surface of the fluid.

ALICE MACDONALD.

Witnesses:
OLIVER IMRAY,
JNO. P. M. MILLARD.